United States Patent [19]

Stone

[11] 4,081,046
[45] Mar. 28, 1978

[54] DRIVE TRAIN SUPPORT FOR AN ARTICULATED VEHICLE

[75] Inventor: Lawrence J. Stone, Livonia, Mich.
[73] Assignee: Massey-Ferguson Inc., Detroit, Mich.
[21] Appl. No.: 735,868
[22] Filed: Oct. 27, 1976
[51] Int. Cl.² .................................................. B60D 1/02
[52] U.S. Cl. ................................ 180/14 B; 180/14 E; 180/51; 180/52
[58] Field of Search ............... 180/14 B, 14 R, 14 E, 180/51, 52

[56] References Cited

U.S. PATENT DOCUMENTS

| 3,049,186 | 8/1962 | Garrett | 180/51 |
| 3,349,864 | 10/1967 | Wagner | 180/51 |
| 3,367,437 | 2/1968 | Garrett | 180/51 |
| 3,568,788 | 3/1971 | Mayeaux | 180/51 |
| 3,773,129 | 11/1973 | Anderson | 180/14 B |

Primary Examiner—Joseph F. Peters, Jr.
Assistant Examiner—Donn McGiehan
Attorney, Agent, or Firm—John C. Thompson

[57] ABSTRACT

An articulated vehicle having forward and rearward frame sections connected together for relative movement about a vertical axis during steering and for oscillation or twisting about a horizontal axis during movement on uneven terrain in which the drive train is supported in such a manner that the angles of displacement of universal connections between drive shafts are maintained at equal angles for all angles of articulation and oscillation.

13 Claims, 10 Drawing Figures

_Fig. 7_

_Fig. 8_

_Fig. 9_

Fig.10

DRIVE TRAIN SUPPORT FOR AN ARTICULATED VEHICLE

This invention relates to articulated vehicles and more specifically to the drive train for such articulated vehicles.

Articulated vehicles having forward and rearward frame sections which move relative to each other about a vertical axis during steering and which also oscillate about a generally longitudinal axis are known in the prior art. Such vehicles frequently have the power plant mounted on one of the frames, usually the forward frame, and power is transmitted from the power plant to the ground engaging wheels on the forward frame and to driven ground engaging wheels on the rear frame. Transmission of power from the engine to the rear driven wheels becomes a problem because the two frames articulate as well as oscillate relative to each other. The problem is compounded because the relative angular displacement of drive shafts must be shared by at least two universal joints since a single universal joint normally is not capable of effectively transmitting power through angles as large as those which occur between the forward and rearward frame sections of such vehicles. For example, if 42° of articulation is possible to either side of the center line of the vehicle, and if a single universal coupling is limited to 25° of displacement, it becomes necessary to use at least two universal connections. These universal connections should share the angular displacement equally, that is, each should have a maximum displacement of 21° to afford a safety factor of a few degrees. Moreover, if the angles between the two universal joints is unequal, rotational velocities in the various components varies and imposes loads on the universal couplings which shortens their service life.

Although the articulation and oscillation often can be accommodated by a plurality of universal joint connections interposed between a plurality of shafts, it is necessary to properly support the shafts and to maintain the various universal joints in particular angular attitudes relative to each other to avoid the excessive angles which cause aggravated wear and short life of the universal connections and bearings.

It is an object of the invention to provide an articulated vehicle having a drive train which is supported in a manner minimizing loads on the various components of the drive train.

Still another object of the invention is to provide an articulated vehicle having a drive train in which a minimum number of universal connections are employed between the various drive shafts to accommodate a maximum of articulation between forward and rearward sections of the vehicle.

Another object of the invention is to provide a drive train for an articulated vehicle which is supported in such a manner that universal connections adjacent to the point of articulation are subjected to equal angular displacement to maintain uniform loading.

An articulated vehicle is provided in which the drive train is supported adjacent an intermediate portion of the vehicle in such a manner that during steering and oscillation of the forward and rearward frame sections, the drive shafts of the drive train are supported so that the angles of universal connections between adjoining shafts are maintained at a minimum and equal to each other. The support for the drive train is such that upon oscillation of the frame sections, during which the driven portion on the rear frame is displaced to one side of central longitudinal axis of the forward frame, the driven shaft of the drive train is guided a proportional amount to the same side to maintain the axis of the driven shaft in intersecting relationship with the vertical pivot axis between the forward and rearward frame sections. This insures that the angular displacement of universal connections spaced equal distances from the vertical steering axis remain equal to permit maximum articulation and minimize loading and wear.

Referring first to FIGS. 1–9, the vehicle 10 incorporating the invention includes a forward frame section 12 and a rearward frame section 14 joined together for relative movement about a vertical axis during steering or articulation of the vehicle and about a generally longitudinal or horizontal axis for oscillation or twisting during movement of the vehicle over uneven terrain. The forward and rearward frame sections 12 and 14 are supported on ground engaging forward wheels 16 and rearward wheels 18, respectively, all of which are powered from an engine 20 mounted on the forward frame section 12. The forward frame section also has an operator's station in the form of a cab 22.

Figure 1:
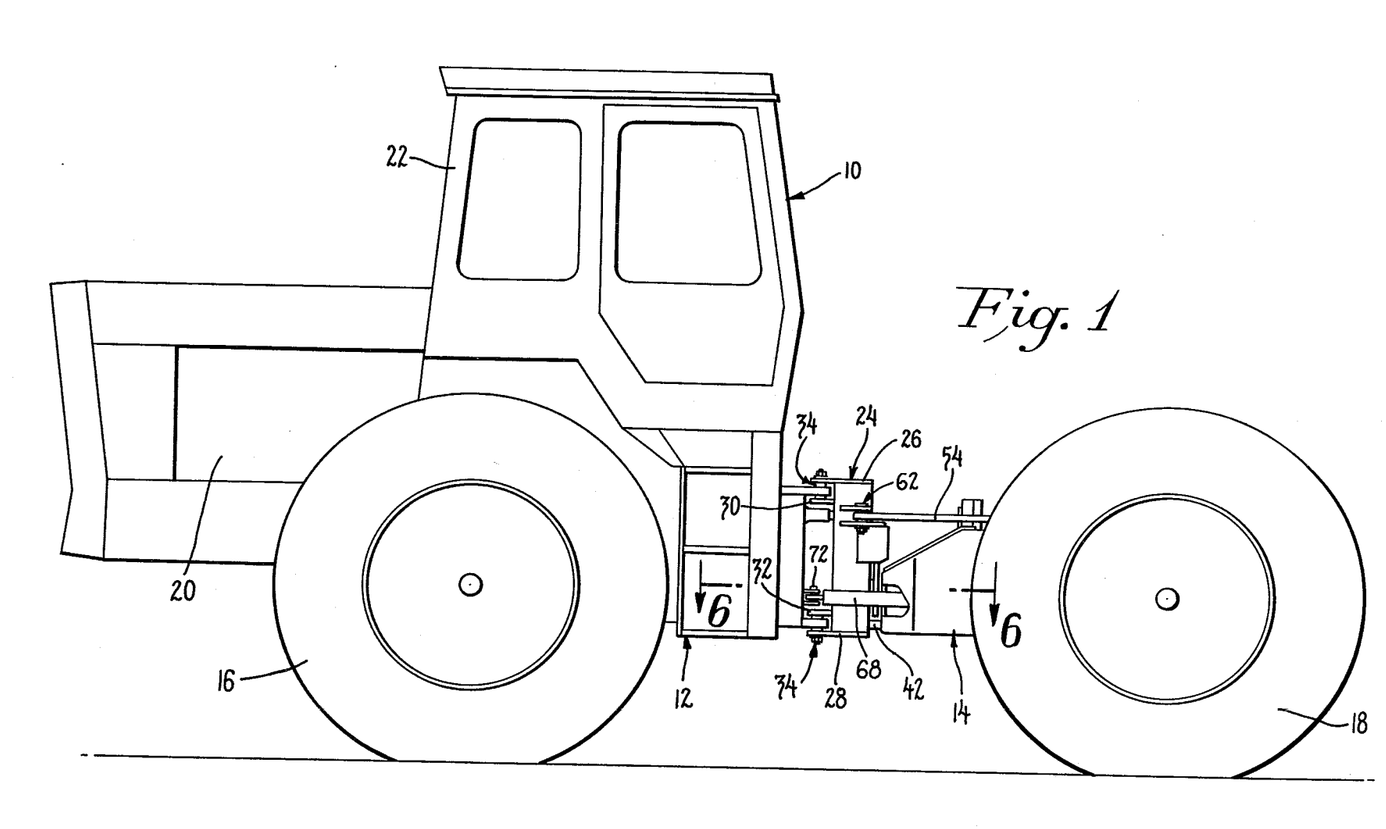
FIG. 1 is an elevation of an articulated vehicle embodying the present invention.
Figure 2:
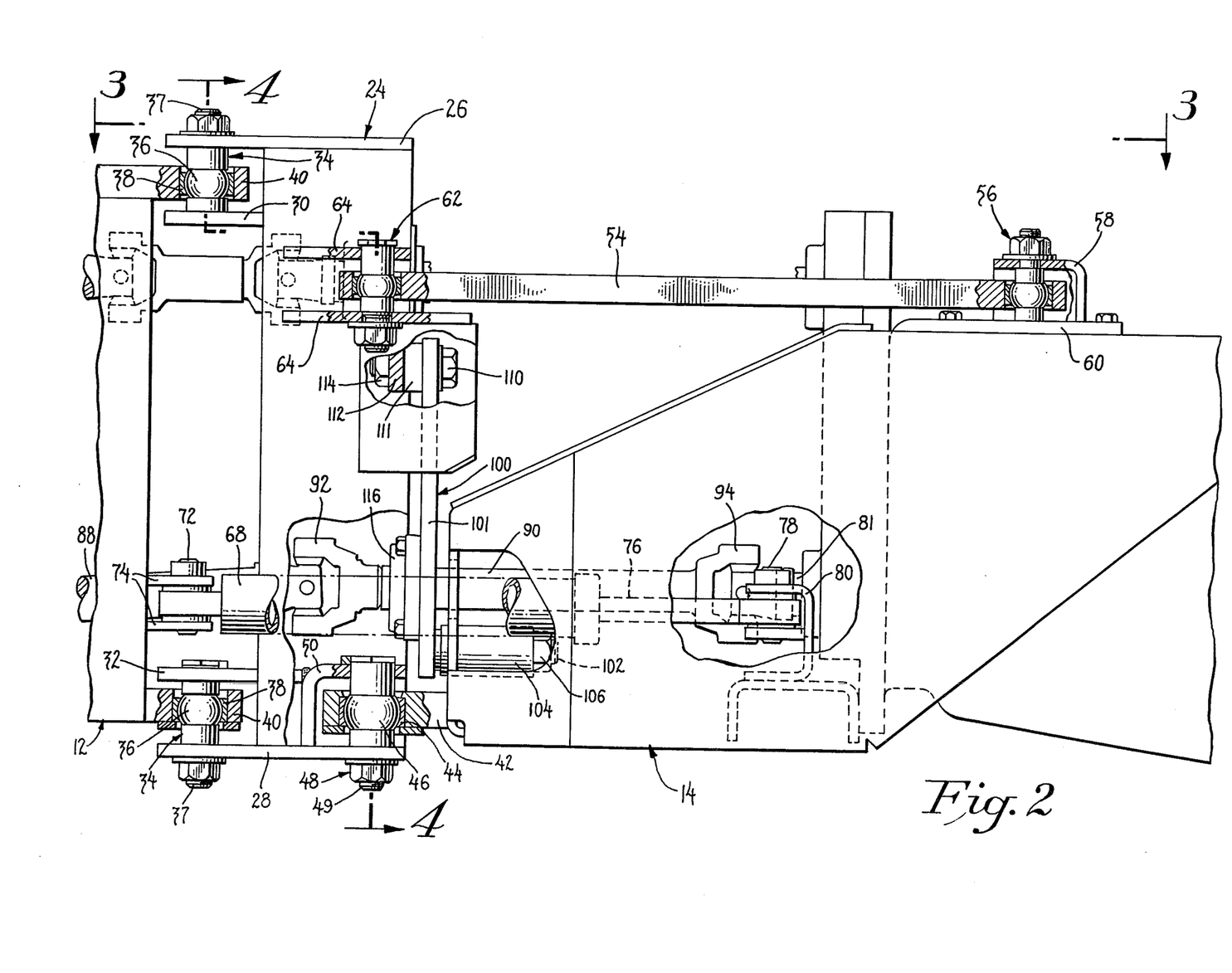
FIG. 2 is a view at an enlarged scale of a central portion of the vehicle seen in FIG. 1 with parts broken away and removed in the interest of clarity.
Figure 3:
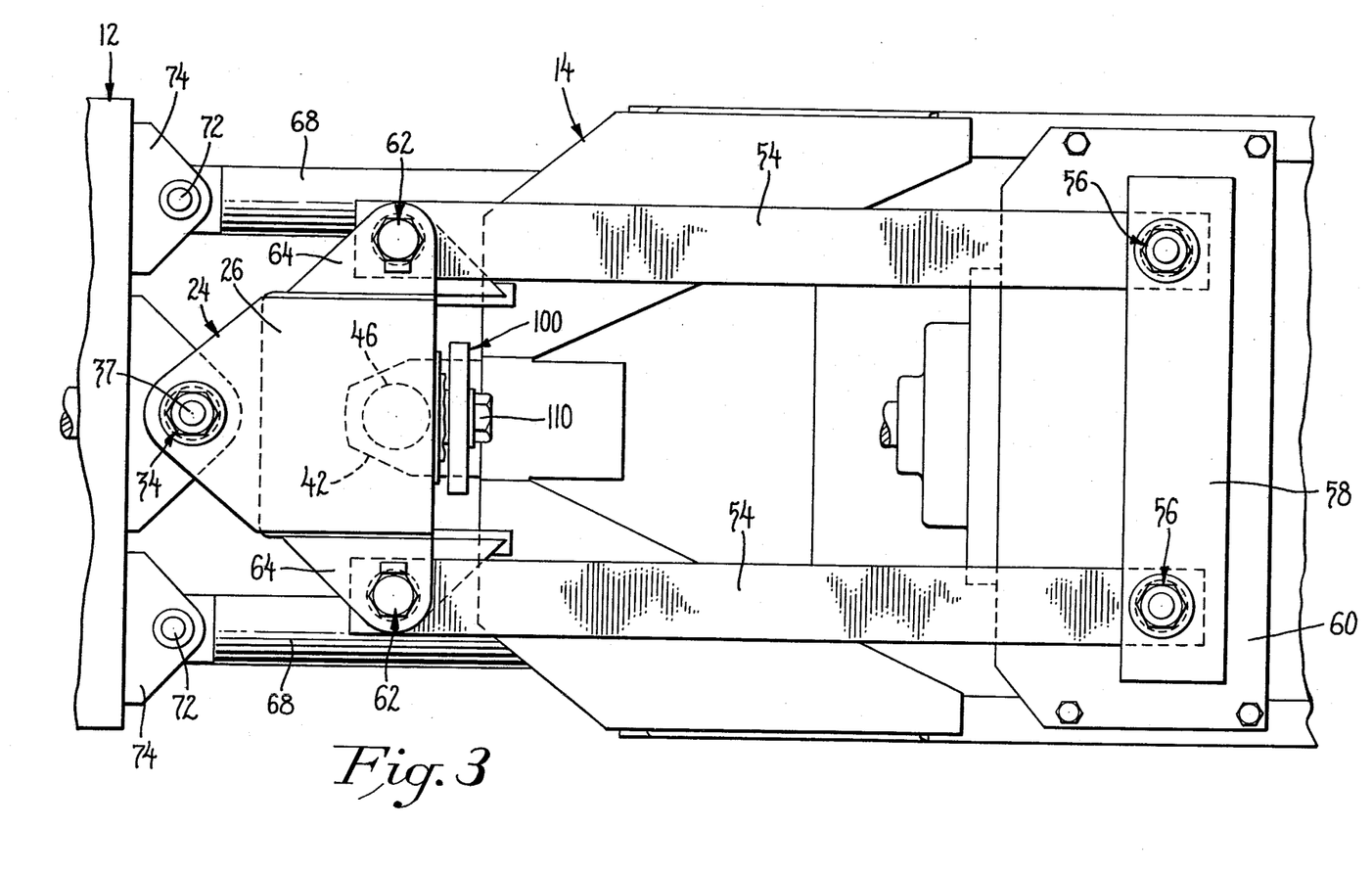
FIG. 3 is a sectional view taken on line 3—3 in FIG. 2.

The forward and rearward frame sections 12 and 14 are connected together through an intermediate or hinge frame 24 which, as best seen in FIGS. 1, 2 and 3, includes top and bottom plates 26 and 28 which are generally triangular and corresponding parallel plates 30 and 32. The plates 26, 28, 30 and 32 are provided with vertically aligned openings to receive opposite ends of a pair of ball pin assemblies 34 each of which has a ball portion 36 on a pin 37 and journaled in a bushing or seat portion 38. The seat portions are held in vertically spaced apart relationship by ears 40 which protrude rearwardly from the forward frame section 12 along the longitudinal central plane of the vehicle. The pair of ball pin assemblies 34 form a vertical axis about which the intermediate or hinge frame 24 may pivot relative to the forward frame section 12 during steering movement of the vehicle as will be described later.

As best seen in FIG. 2, the connection between the rearward frame section 14 and the hinge frame 24 is provided by a tongue member 42 which projects forwardly from a lower portion of the rearward frame section 14. The tongue member 42 supports a bearing 44 receiving the ball portion 46 of a ball pin assembly 48 similar in construction to assemblies 34 and having opposite ends of its pin 49 supported in aligned openings in the lower plate 28 and a yoke member 50 formed integrally with the plate 28. This connection forms a hitch point which permits limited oscillation of the rear frame section 14 about an axis extending generally horizontally and longitudinally of the vehicle 10.

An additional stabilizing connection between the rearward frame member 14 and the hinge frame 24 is provided by a pair of stabilizer bars 54 which are disposed in a generally horizontal plane above the ball hitch connection formed by the ball pin assembly 48. The rearward ends of the stabilizer bars 54 are connected to the rear frame section 14 by a pair of rear ball pin assemblies 56 held in position by a bracket 58 and plate 60 fastened on an upper portion of the rear frame section 14. In a similar manner the forward ends of the stabilizer bar 54 are connected by means of ball pin assemblies 62 supported by spaced apart plate members 64 formed integrally with the hinge frame 24 and in horizontal alignment with the bracket 58, 60 on the rear frame section 14. The rear frame 14 is connected to the hinge frame 24 by the lower ball connection 48 and the upper pair of stabilizer bars 54 and during oscillation of the rear frame section about the ball connection 48, the stabilizer bars 54 act as parallel links to guide and limit movement of the upper portion of the rear frame section 14 relative to the hinge frame 24.

Figure 6:
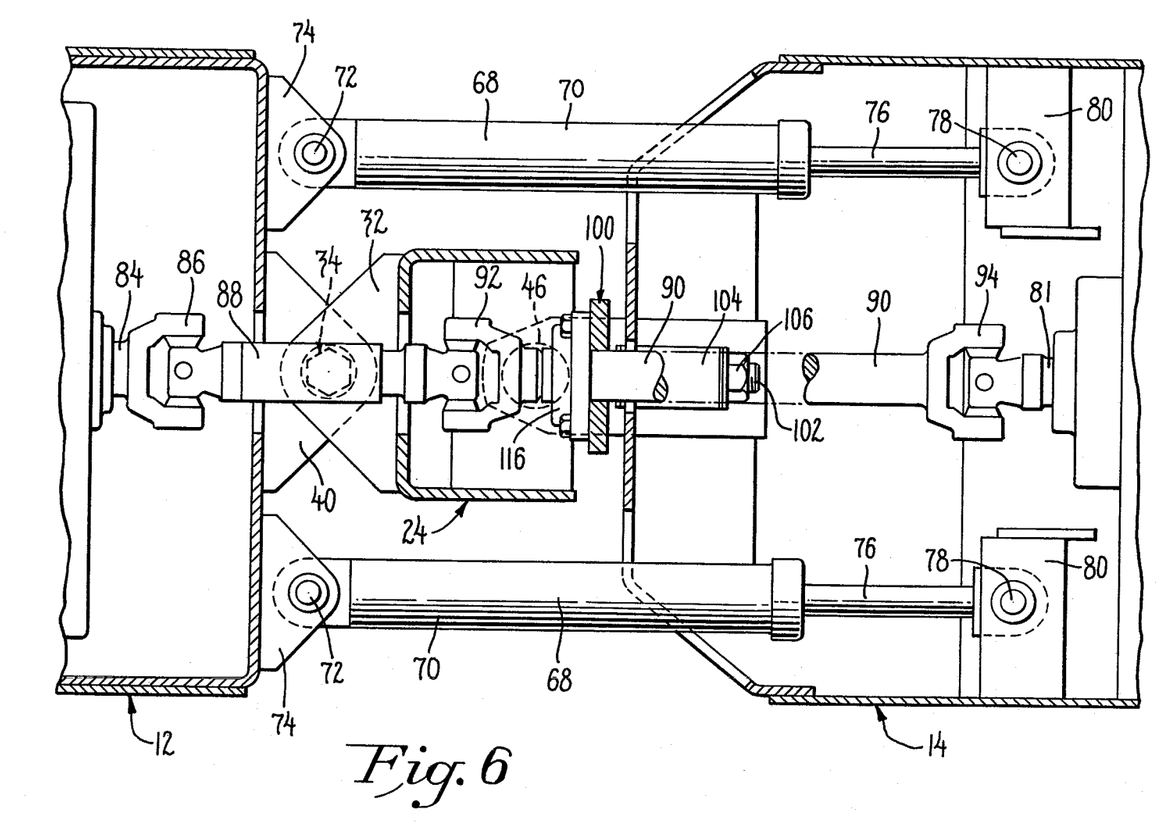
FIG. 6 is a sectional view at an enlarged scale taken on line 6—6 in FIG. 1.

Steering or articulation of the front and rear frame members 12 and 14 about the vertical axis is accomplished by a pair of hydraulic actuators 68 which as best seen in FIGS. 2, 3 and 6 each have a cylinder 70, the end of which is pivotally connected by a pin at 72 to ears 74 formed integrally with the forward frame section 12. The actuators 68 also each include a rod member 76 pivotally connected at 78 to a bracket member 80 formed integrally with the rear frame section 14. Steering of the vehicle by articulating the forward and rearward frames 12 and 14 about the vertical axis extending through the ball pin assemblies 34 is accomplished by an operator in the operator's station 22 who during steering causes hydraulic fluid to be delivered to the cylinders to cause extension of one rod 76 from its cylinder 70 and at the same time causes retraction of the other rod 76 into the other cylinder 70.

The drive arrangement by which power is transmitted from the engine 20 on the forward frame section 12 to a driven shaft 81 connected to the rear driving wheels 18 on the rearward frame section 14 is best seen in FIG. 6. The engine 20 transmits power to a transmission having output shaft 84 connected by a universal joint or connection 86 to the forward end of a drive shaft 88 to permit angular displacement of the shafts 84 and 88. The rearward end of the drive shaft 88 is drivingly connected to a driven power transmitting shaft 90 by a universal joint 92 to permit relative angular displacement of shafts 88 and 90. The rearward end of the driven shaft 90 also is connected by a universal joint 94 to the driven or input shaft 81 connected to the rear driving wheels of the vehicle 10. In the attitude shown in FIG. 6, the drive shaft 88 and the driven shaft 90 extend longitudinally on the center line of the vehicle when the front and rear sections 12 and 14 are aligned with each other. In that position it will be noted that the universal joint 86 and the universal joint 92 are disposed equal distances from the vertical axis formed by pin assemblies 34.

Figure 5:
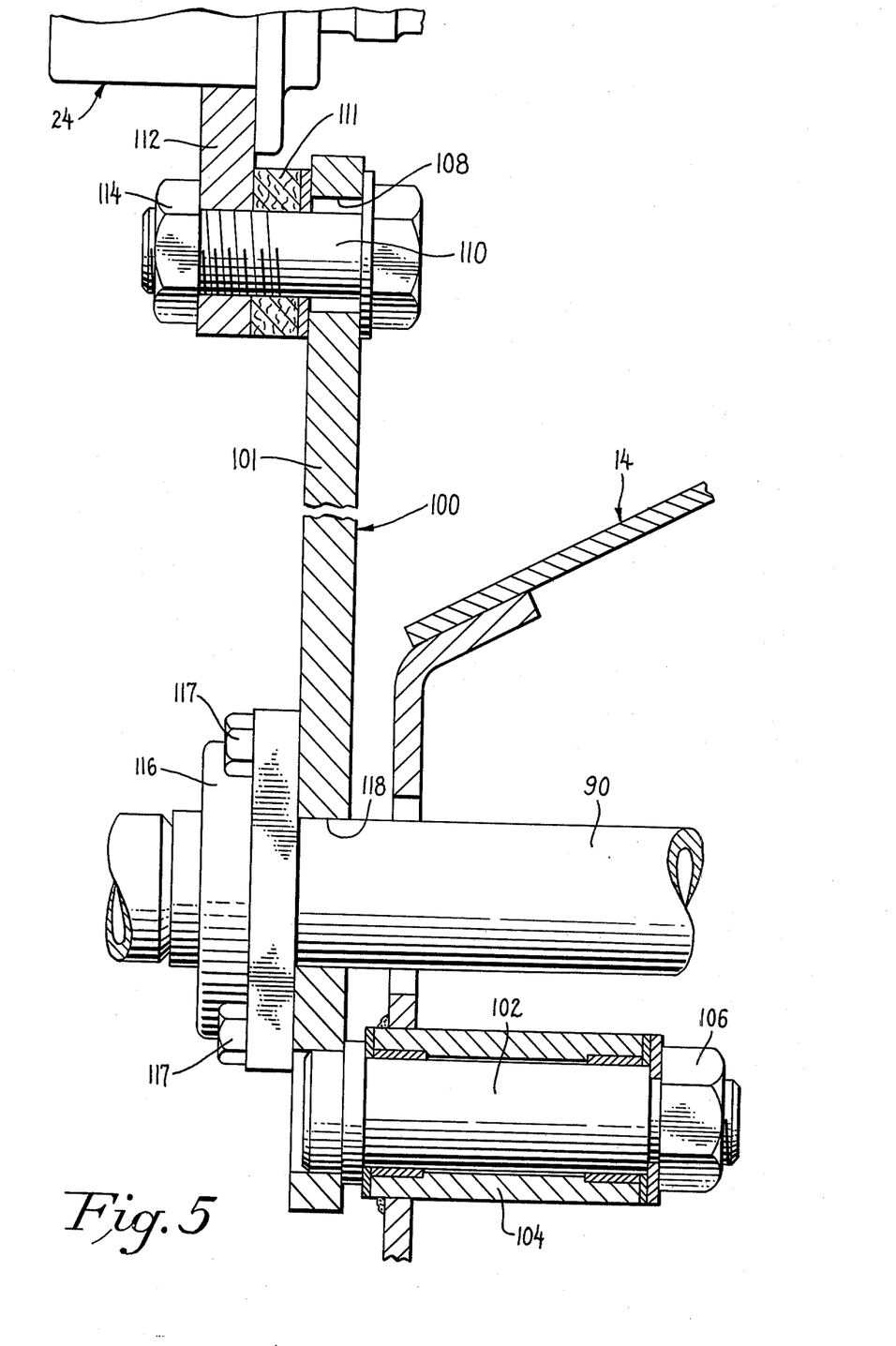
FIG. 5 is a sectional view at an enlarged scale taken generally on line 5—5 in FIG. 4.

The articulated drive train formed by the shaft 88 and 90 is supported at its opposite ends by the universal joints 86 and 94 and at an intermediate location by a mounting member or support structure 100. As seen in FIG. 5, the mounting member 100 includes a vertically depending arm 101 having an aperture which receives one end of a pin 102. The pin 102 is journaled for rotation in a bearing member 104 rigidly mounted on the rear frame section 14 in its central longitudinal plane. The pin 102 is held in an axially fixed position by a nut 106 which permits pivotal movement of the arm 101 about a generally horizontal, fore-and-aft extending axis relative to the rear frame section 14. The upper end of the arm 101 is formed with a vertically elongated slot 108 which receives a bolt 110 forming a pivot member which passes through a felt washer 111 and an opening in a depending bracket 112. The bolt 110 is held in position by a nut 114 and forms a pivot for the arm 101 relative to the hinge section 24. The elongated slot 108 permits arm 101 to move longitudinally a limited amount upon twisting movement of the hinge and rear frame sections 24 and 14 relative to each other.

At a point between the pivot pin 102 and the bolt or pivot pin 110, the arm 101 supports a bearing 116 which is connected to the arm 101 by bolts 117. The bearing 116 rotatably supports an intermediate portion of the driven shaft 90 which passes through an opening 118 in the arm 101.

Figure 7:
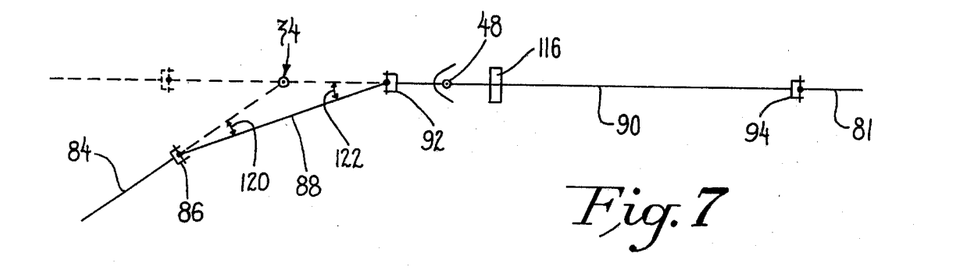
FIG. 7 is a diagrammatic view illustrating various positions of the drive train of the vehicle during steering.
Figure 8:
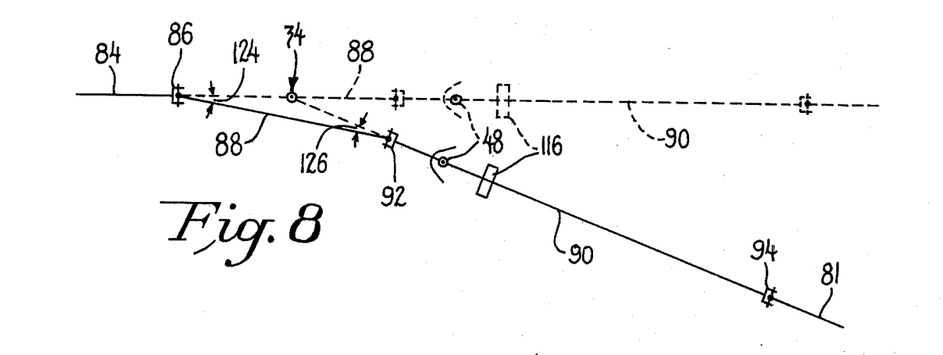
FIG. 8 is a digrammatic view of the drive train components during oscillation of the vehicle.
Figure 9:
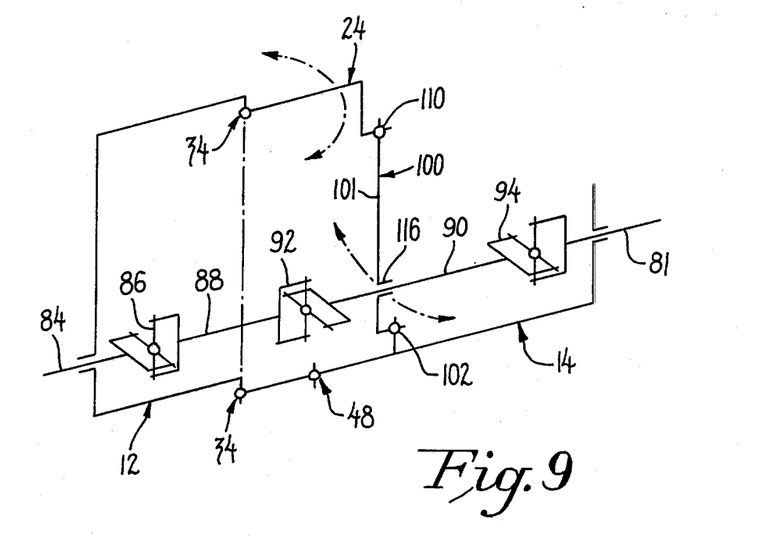
FIG. 9 is a diagrammatic schematic view of the drive train components.

The operation of the support structure 100 can best be understood by reference to FIGS. 7, 8 and 9 in which the various pivot points and axes of the drive shaft are indicated diagrammatically. The drive shafts 88 and 90 are aligned when the vehicle is on a horizontal surface and the vehicle is being moved in a straight line. If the steering mechanism is operated so that the forward frame 12 turns towards the left side of the vehicle relative to the rearward frame 14, the drive shaft 88 will assume the angular position illustrated in full lines in FIG. 7 and the axial extensions of shafts 84 and 90 will intersect the vertical axis at 34. Since the universal connections 86 and 92 are spaced equal distances to opposite sides of the vertical axes through pin assemblies 34, the angles formed at opposite ends of the drive shaft 88 and the axial extensions of the output shaft 84 the driven shaft 90 as indicated at 120 and 122 will be equal. It is important that this angular relationship be maintained during all operations of the vehicle for the reason that universal connections afford a maximum angular displacement of two connecting shafts, for example, 25°. Consequently, if the front and rear frames of the vehicle 10 are to be angled 42° to either side of the center, maintenance of equal angles at 120 and 122 of 21° will afford a margin of safety. The relationships just referred to are those which would be encountered when the vehicle is being steered on a level surface during which no twisting or oscillation occurs between the hinge frame 24 and the rearward frame 14.

Figure 4:
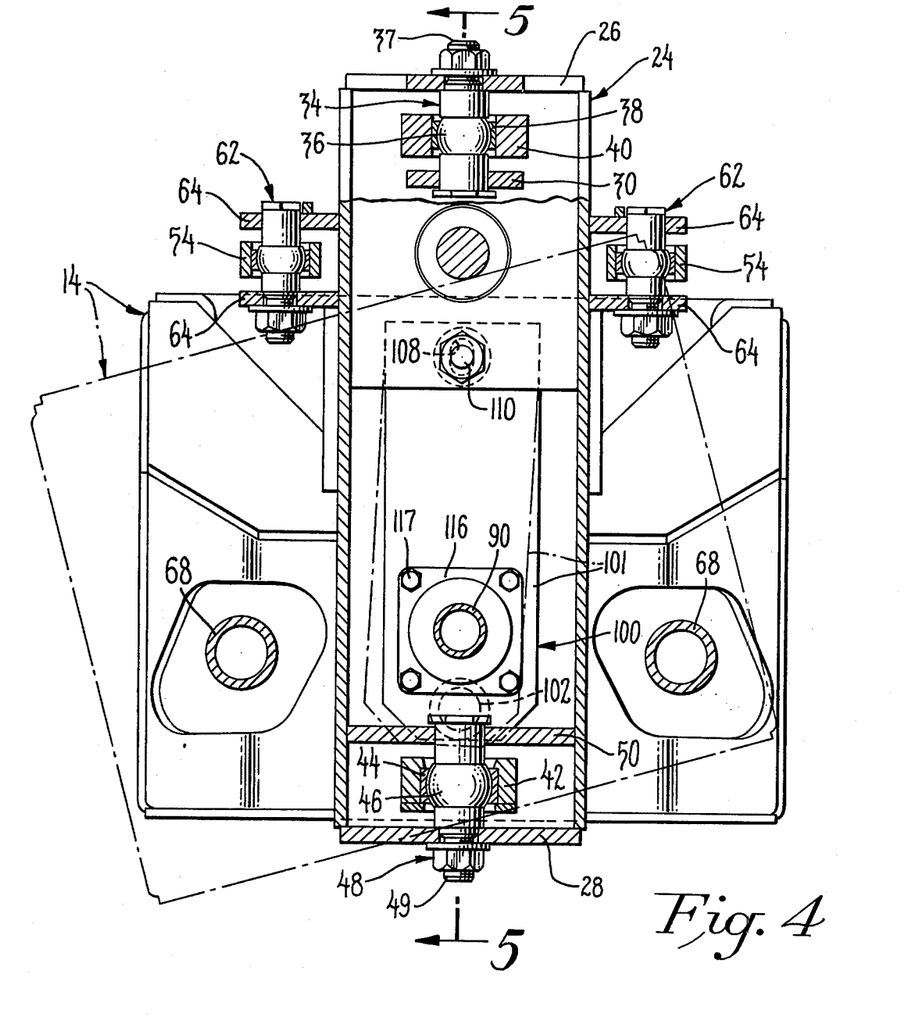
FIG. 4 is a sectional view taken on line 4—4 in FIG. 2.

The condition which occurs during oscillation or twisting of the rear frame 14 relative to the forward frame 12 and hinge frame 24 is illustrated in FIGS. 4, 7 and 8. In FIG. 4 the phantom lines indicate the condition under which the rear frame 14 has oscillated in a counterclockwise direction about the generally horizontal axis formed by the pivot ball assembly 48. Such twisting movement will cause displacement of the lower pivot pin 102 to the side a given amount as a result of which the axis of the shaft 90 also is displaced to the side a smaller amount due to the pivotal connection of the upper end of the arm 101 to the pin 110. The displacement of the arm 101 from the full to the broken line position in FIG. 4 causes lateral displacement of bearing 116 and the journaled portion of driven shaft 90 so that an axial extension of shaft 90 will intersect the vertical axis through pin assemblies 34 as seen in FIG. 8. The universal joint 92 on shaft 90 also is displaced laterally so the rearward end of shaft 88 is displaced and maintains an equal angle at the points indicated at 124 and 126 for the purpose previously described.

By supporting the drive shaft in this manner, that is, by the bracket assembly 100, relative movement between the forward and rearward frames 12 and 14 during oscillation is transmitted to the driven shaft 90 to move it a suffecient amount to one side or the other of a central longitudinal plane so that the driven shaft 90 is maintained in alignment with the vertical axis about which the frame members 12 and 14 pivot during steering and in so doing the angle between the universal connections 86 and 92 remains equal to permit effective power transmission and minimize wear of the universal connections.

Figure 10:
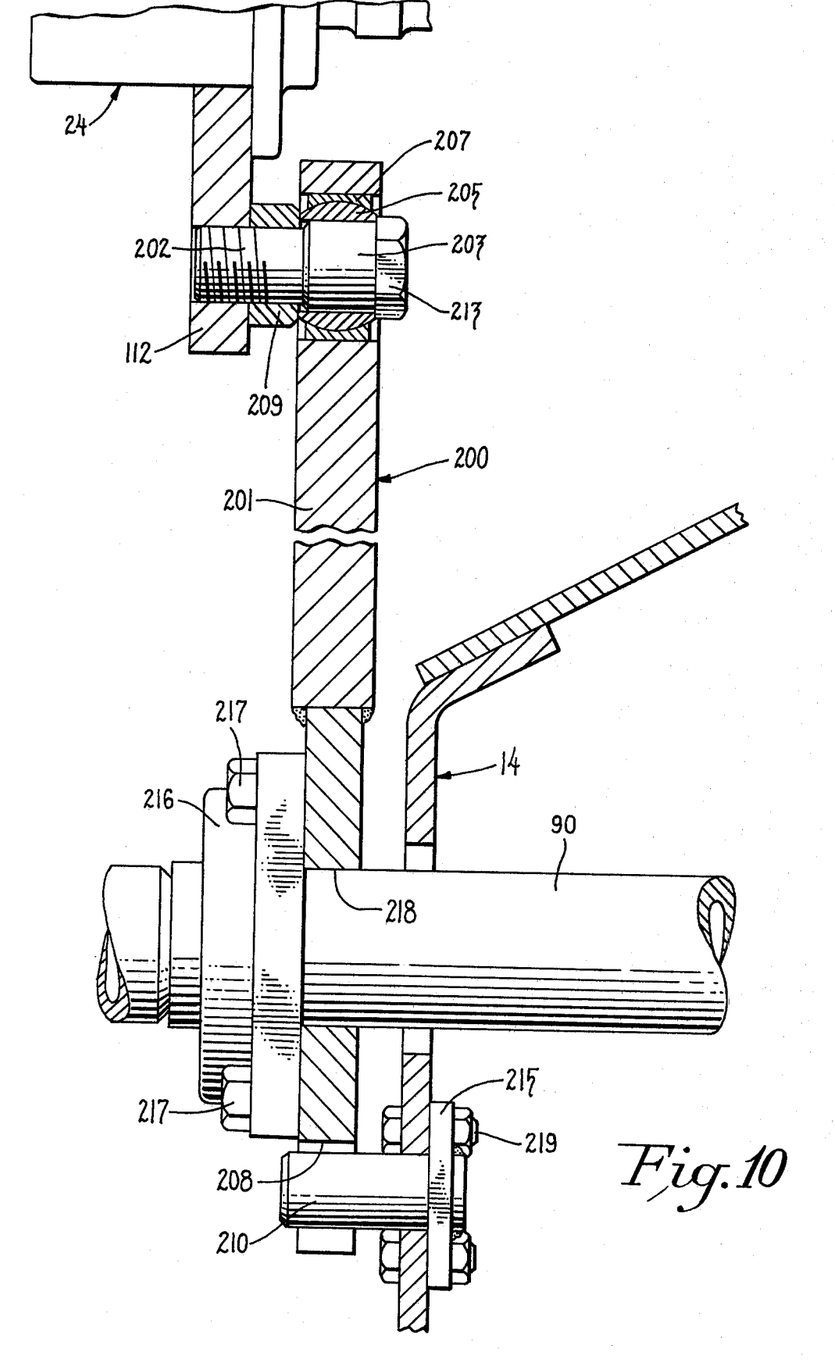
FIG. 10 is a view of a second embodiment of this invention, this view being similar to FIG. 5.

Referring now to FIG. 10, a second embodiment of a support structure is illustrated, the second support structure or mounting member being indicated generally at 200. This structure includes a vertically depending arm 201 which functions in an identical manner to the arm 101, however, the arm is mounted in a different manner. Thus, the upper end of the arm is provided with an aperture which receives one end of a pin or bolt 202, one end of which is threaded into an opening in depending bracket 112. An enlarged portion 203 of the pin 202 receives a sleeve member 205 having a spherical outer surface, the member being mounted within a spherical bearing 207 received within the aperture at the upper end of the arm. A spacer 209 is disposed between the sleeve 205 and the bracket 112, the head 213 of the bolt 202 in turn bearing against the member 205 to hold the parts in their assembled relationship. The lower end of the arm is provided with a vertically elongated slot 208 which receives a pin 210. The pin 210 is in turn welded to a plate 215 mounted on a portion of the frame 14 by bolts 219.

At a point between the pivot pin 202 and the pin 210, the arm 201 supports a bearing 216 which is connected to the arm 201 by bolts 217. The bearing 216 rotatably supports an intemediate portion of the driven shaft 90 which passes through the opening 218 in the arm 201.

What is claimed is:

1. An articulated vehicle comprising; a forward frame and a rearward frame, a hinge frame between said forward and rearward frames, said frames being connected to each other for steering movement about a generally vertical axis and for relative twisting movement about a generally horizontal axis, a power plant mounted on said forward frame, a driven member mounted on said rearward frame, a drive train between said power plant and said driven member, said drive train including a driven shaft having a universal connection to said driven member, a drive shaft having a forward universal connection to said power plant, an intermediate universal connection between said drive shaft and driven shaft, a mounting member having spaced portions pivotally connected to said hinge frame and to said rearward frame, respectively, and means supporting said driven shaft on said mounting member for movement in a path maintaining said driven shaft and vertical axis in a common plane during steering and twisting movement of said frames relative to each other.

2. The combination of claim 1 in which said spaced portions of said mounting member are pivotally connected for movement about vertically spaced axes extending longitudinally of said rearward frame.

3. The combination of claim 2 in which said vertically spaced axes are disposed in opposite directions from the axis of rotation of said driven shaft.

4. The combination of claim 1 in which said forward and intermediate universal connections are maintained in equally spaced relationship from said vertical axis during steering and twisting movement of said frames.

5. The combination of claim 1 in which the angles at opposite ends of said drive shaft and formed between said drive shaft and a common point on said vertical axis remain equal during all conditions of steering and twisting of said forward and rearward frames relative to each other.

6. The combination of claim 1 in which said horizontal axis is disposed below said drive train.

7. The combination of claim 1 in which said vertical axis is formed between said forward and hinge frames and said horizontal axis is formed between said rearward frame and said hinge frame.

8. The combination of claim 7 and further comprising a pair of horizontally spaced, longitudinally extending stabilizer members having opposite ends pivotally connected to said hinge frame and to said rearward frame for guiding an upper portion of the latter transversely of said vehicle during twisting movement of said rearward frame relative to said hinge frame about said horizontal axis.

9. The combination of claim 1 in which said mounting member is an elongated structure extending generally vertically and rearwardly of said intermediate universal connection.

10. A drive train for an articulated vehicle comprising; a forward frame and a rearward frame, means supporting said frames relative to each other for steering movement about a vertical axis and for relative twisting movement about a generally horizontal axis, drive train means between said forward and rearward frames including a driven shaft extending generally longitudinally of said vehicle and parallel to said horizontal axis, a mounting member having opposite ends pivoted about a first axis disposed in a common vertical plane passing through said vertical axis and a second axis on said rearward frame, bearing means connecting said driven shaft to said mounting member, said first and second axes of said mounting member being spaced vertically from each other to opposite sides of the axis of rotation of said driven shaft for moving the driven shaft laterally from said plane upon relative twisting movement of said frames about said horizontal axis to maintain the rotational axis of said driven shaft in intersecting relation with said vertical axis.

11. The combination of claim 10 and further comprising a driving member on said forward frame, a drive shaft, a pair of universal connections at opposite ends of said drive shaft and between said driving member and driven shaft, respectively, said ends of said shaft being disposed equal distances from said vertical axis.

12. The combination of claim 11 in which the angles of displacement of said universal connections at opposite ends of said shaft are equal during all conditions of steering and twisting of said forward and rearward frames relative to each other.

13. The combination of claim 11 in which said horizontal axis is disposed to one side of said driven shaft and said first and second axes are disposed above said driven shaft.

* * * * *